United States Patent
Gupta et al.

(10) Patent No.: US 10,124,828 B2
(45) Date of Patent: Nov. 13, 2018

(54) AUTONOMOUS VEHICLE STEERING CONTROL METHODS AND SYSTEMS

(71) Applicant: GM GLOBAL TECHNOLOGY OPERATIONS LLC, Detroit, MI (US)

(72) Inventors: Pinaki Gupta, Novi, MI (US); Nikhil L. Hoskeri, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 20 days.

(21) Appl. No.: 15/183,566

(22) Filed: Jun. 15, 2016

(65) Prior Publication Data

US 2017/0361872 A1    Dec. 21, 2017

(51) Int. Cl.
  B62D 15/02      (2006.01)
  B62D 1/02       (2006.01)
  B62D 7/15       (2006.01)

(52) U.S. Cl.
  CPC ............ B62D 15/025 (2013.01); B62D 1/02 (2013.01); B62D 7/159 (2013.01)

(58) Field of Classification Search
  None
  See application file for complete search history.

(56) References Cited

U.S. PATENT DOCUMENTS

| | | | | |
|---|---|---|---|---|
| 5,238,077 A * | 8/1993 | Vaughn | ................ | B62D 7/159 180/415 |
| 6,050,359 A * | 4/2000 | Mouri | ................ | B62D 1/28 180/168 |
| 7,975,800 B2 * | 7/2011 | Hummel | ................ | B62D 7/144 180/419 |
| 8,886,412 B2 | 11/2014 | Rosol et al. | | |
| 2002/0007239 A1 * | 1/2002 | Matsumoto | ............ | B62D 7/159 701/41 |
| 2006/0025896 A1 * | 2/2006 | Traechtler | ............ | B60W 10/20 701/41 |
| 2015/0321696 A1 * | 11/2015 | Jang | ................ | B62D 7/159 701/43 |
| 2015/0346724 A1 * | 12/2015 | Jones | ................ | B62D 15/025 701/23 |
| 2016/0368534 A1 * | 12/2016 | Harda | ................ | B62D 15/025 |
| 2017/0253241 A1 * | 9/2017 | Filev | ................ | B60W 10/04 |

FOREIGN PATENT DOCUMENTS

JP      2009126192 A    *   6/2009

OTHER PUBLICATIONS

Sasaki; Machine translation of JP-2009126192-A; Jun. 2009; espacenet.com (Year: 2009).*

* cited by examiner

*Primary Examiner* — David P. Merlino
(74) *Attorney, Agent, or Firm* — Lorenz & Kopf, LLP

(57) ABSTRACT

Methods, apparatus and systems are provided for steering a vehicle, for example, during autonomous operation. One exemplary method involves operating a locking system associated with a first set of one or more wheels of the vehicle to lock an angle of the wheel(s) and detecting a steering adjustment condition based on the angle during subsequent operation of the vehicle. In response to the steering adjustment condition, the locking system is operated in an intermediate mode, and then thereafter operated to relock the angle of the wheel(s) based on monitoring the angle of the wheel(s) during operation in the intermediate mode.

18 Claims, 4 Drawing Sheets

AUTONOMOUS VEHICLE STEERING CONTROL METHODS AND SYSTEMS

TECHNICAL FIELD

Embodiments of the subject matter described herein generally relate to vehicle systems, and more particularly relate to systems and methods for controlling vehicle steering, and in particular, during autonomous operation.

BACKGROUND

In recent years, advances in technology have led to substantial changes in the design of automotive vehicles. In particular, autonomous operating features are increasingly being incorporated in current and next generation vehicles. However, potentially problematic combinations of vehicle configurations and operational situations can be foreseen as a consequence of new developments. Accordingly, it is desirable to provide methods and systems for mitigating potentially problematic vehicle configurations. Other desirable features and characteristics will become apparent from the subsequent detailed description and the appended claims, taken in conjunction with the accompanying drawings and the foregoing technical field and background.

SUMMARY

In one of various exemplary embodiments, a method of steering a vehicle is provided. The method involves operating a locking system associated with a first set of one or more wheels of the vehicle to lock an angle of the first set and detecting a steering adjustment condition based on the angle during operation of the vehicle while the angle is locked. In response to detecting the steering adjustment condition, the method continues by operating the locking system in an intermediate mode and thereafter operating the locking system to relock the angle of the first set based on the angle of the first set during operation in the intermediate mode.

In another embodiment, a vehicle system is provided. The vehicle includes a locking system coupled to a first set of one or more wheels to selectively lock a first angle of the first set, a steering system coupled to a second set of one or more wheels to control a second angle of the second set, and a control system coupled to the locking system and the steering system. The control system is configured to command the locking system for a locked mode to lock the first angle, determine roadway curvature characteristics associated with a current location of the vehicle, command the steering system to adjust the second angle based on the roadway curvature characteristics when the first angle is locked, detect a steering adjustment condition based on the first angle and the roadway curvature characteristics, and command the locking system for an intermediate mode in response to the steering adjustment condition to unlock the first angle.

In yet another embodiment, a locking system is also provided. The locking system includes a locking mechanism having a range of motion, an actuation arrangement coupled to the locking mechanism, a first control module coupled to the actuation arrangement to obtain and output sensed information indicative of a status of the actuation arrangement, and a second control module coupled to the first control module and the actuation arrangement. The second control module is configured to command the actuation arrangement based on the sensed information indicative of the status of the actuation arrangement, wherein in response to receiving an intermediate mode command, the second control module is configured to operate the actuation arrangement until the locking mechanism resides at an intermediate position within the range of motion.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, summary or the following detailed description.

Embodiments of the subject matter described herein relate to modulating the locking state of a vehicle steering mechanism, such as a steering column, to control the vehicle during autonomous operation. In exemplary embodiments described herein, a locking mechanism for a vehicle steering column supports an intermediate mode (or state) where the locking mechanism is neither fully engaged with nor fully disengaged from the vehicle steering column, but rather, is maintained at an intermediate position within its range of motion. From such an intermediate position, the locking mechanism can be reengaged within a reduced amount relative to reengaging the locking mechanism from a fully disengaged position. In exemplary embodiments, during autonomous vehicle operations, the locking mechanism is temporarily commanded to the intermediate state based on road conditions and steering angles. In the intermediate state, self-aligning torque (SAT) guides the steering angle for the steering column until reaching a desired angle, at which point the locking mechanism is commanded to an engaged (or locked) state. In this regard, reengaging the locking mechanism from the intermediate state can be performed quickly, which minimizes the time spent in the intermediate state where lateral control may be indeterminate.

Exemplary embodiments described below utilize a master-slave control scheme for controlling the locking mechanism to support the intermediate mode based on feedback from the slave control module. To compensate for communications latencies between the control modules, the master control module utilizes feedback regarding the locking mechanism state in conjunction with steering angle measurements and locking commands provided to the locking mechanism to model the behavior of the locking mechanism and thereby estimate the current (or instantaneous) locking state in real-time and control the locking mechanism based on the estimated state. The estimated locking state may also be utilized for diagnostics purposes to identify state mismatches or other potential anomalous conditions when the frequency or refresh rate associated with the slave control feedback lags the frequency or refresh rate associated with the master control or other higher level controllers.

Figure 1:
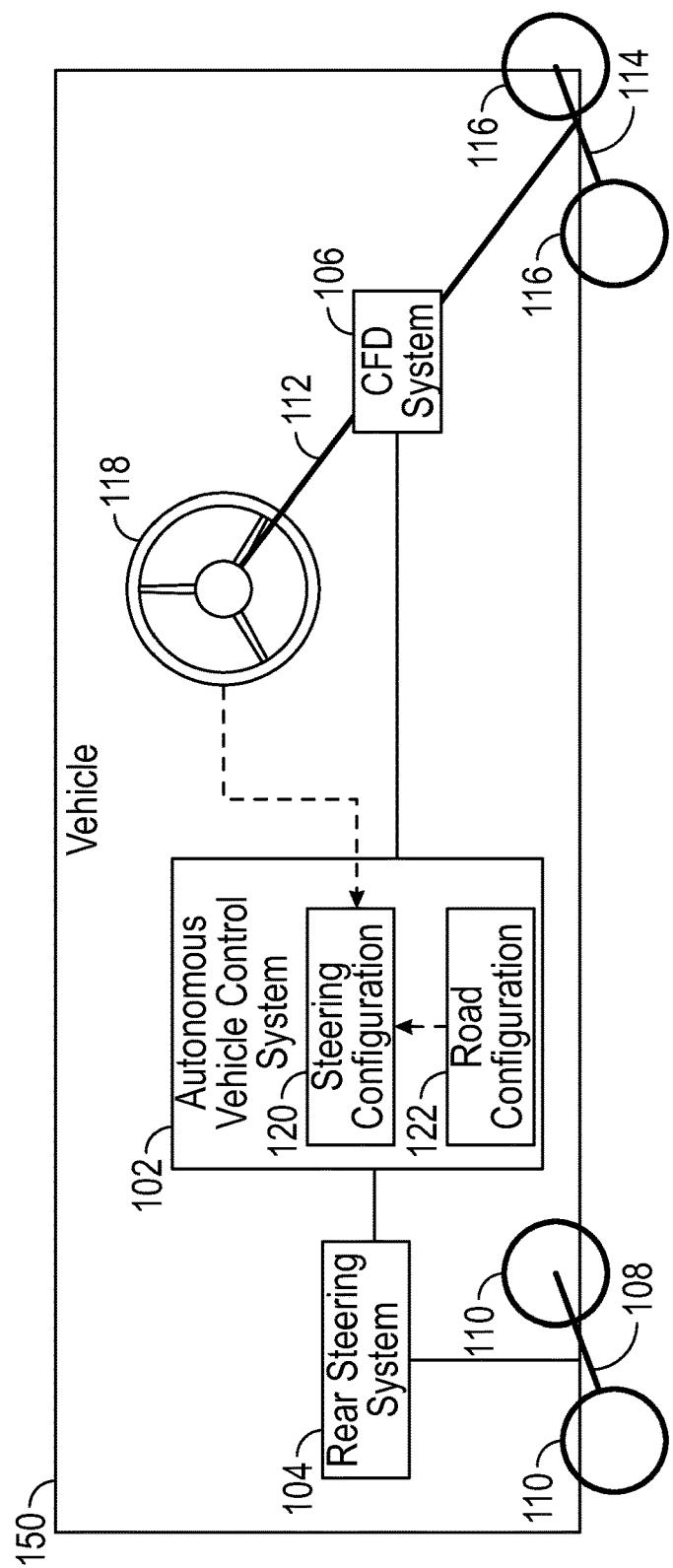
FIG. 1 is a block diagram of an exemplary vehicle system in accordance with one or more embodiments.

Turning now to FIG. 1, an exemplary system 100 suitable for use in an automotive vehicle 150 includes, without limitation, an autonomous vehicle control system 102, a rear steering system 104, and a front steering locking system 106. The rear steering system 104 is mechanically coupled to the rear axle 108 or other rear steering mechanism of the vehicle 150 rear wheels 110. The front steering locking system 106 is mechanically coupled to the steering column 112 or other front steering mechanism of the vehicle 150 that is coupled to the front axle 114 of the vehicle 150 and capable of adjusting the angle of the front wheels 116 relative to the body of the vehicle 150. The front steering locking system 106, alternatively referred to herein as a steering column friction device (CFD) system, is configured to selectively lock or unlock the steering column 112 to fix the angle of the front wheels 116 relative to the vehicle body in response to signals or commands from the autonomous vehicle control system 102, as described in greater detail below. It should be noted that in one or more embodiments, the front steering locking system 106 is different from and provided in addition to a conventional steering lock, where the front steering locking system 106 is primarily utilized for lateral control during autonomous operating modes. For example, during autonomous operation when a driver's hands are not applied to the wheel 118 to provide a force that resists self-aligning torque, the self-aligning torque may realign the front wheels 116 to counteract the rear steering system 104, which could undesirably result in a straight trajectory or some other lateral trajectory not intended by the rear steering system 104. Thus, the front steering locking system 106 may be utilized to lock the front wheels 116 to prevent self-aligning torque from altering the front steering angle, thereby enabling lateral control by the rear steering system 104.

It should be understood that FIG. 1 is a simplified representation of a vehicle system 100 for purposes of explanation and is not intended to limit the scope or applicability of the subject matter described herein in any way. In this regard, practical embodiments of a vehicle system 100 may include any number of additional modules and systems suitably configured to support conventional vehicle operations. In exemplary embodiments, the vehicle 150 is realized as an automobile, and depending on the embodiment, the vehicle 150 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). Depending on the embodiment, the vehicle 150 may be realized as a fully electric vehicle, a plug-in hybrid vehicle, a fuel cell vehicle (FCV) or another suitable alternative fuel vehicle, and/or the vehicle 150 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, and/or a combustion/electric motor hybrid engine.

In the illustrated embodiment, the rear steering system 104 generally represents the combination of mechanical components, hardware, firmware, logic and/or other circuitry suitably configured to adjust the angle of the rear wheels 110 to a desired angle relative to a longitudinal axis to a commanded angle indicated by the autonomous vehicle control system 102. As used herein, the longitudinal axis should be understood as an axis orthogonal to the axles 108, 114 of the vehicle 150 and parallel to the direction of travel when the rear and front wheels 110, 116 are aligned parallel to one another and parallel to the longitudinal axis (e.g., both sets of wheels 110, 116 at steering angles equal to zero). The CFD system 106 generally represents the combination of mechanical components, hardware, firmware, logic and/or other circuitry suitably configured to selectively engage or disengage the steering column 112 in response to signals, commands, or other indication from the vehicle control system 102 to thereby lock (or fix) the rotational position of the steering column 112, which, in turn locks (or fixes) the angle of the front wheels 116 relative to the longitudinal axis (neglecting negligible variations or modulation of the angle due to component variations, manufacturing tolerances, slack, or other factors). As described in greater detail below in the context of FIGS. 3-4, in exemplary embodiments, the CFD system 106 includes a master control module that communicates with a slave module over a local interconnect network (LIN) and an analog interface to control the locking mechanism in a manner that supports an intermediate mode where the CFD system 106 does not fully engage the steering column 112.

The autonomous control system 102 generally represents the component or module onboard the vehicle 150 that is capable of controlling the angles of the axes 108, 114 or wheels 110, 116 of the vehicle 150 during autonomous operation when a human user is not engaging the steering wheel 118 associated with the front steering column 112. In some embodiments, the features and/or functionality of the autonomous control system 102 could be implemented by an electronic control unit (ECU) or other similar supervisory module onboard the vehicle 150. In exemplary embodiments, the autonomous control system 102 may be implemented using any suitable processing system and/or device, such as, for example, one or more processors, central processing units (CPUs), controllers, microprocessors, microcontrollers, processing cores and/or other hardware computing resources configured to support the operation of the autonomous control system 102 described herein. Such a processing system also includes or otherwise accesses a data storage element (or memory) capable of storing programming instructions for execution by the processing system, that, when read and executed, cause the processing system to perform or otherwise support the processes, tasks, operations, and/or functions described herein. Depending on the embodiment, the memory may be realized as a random access memory (RAM), read only memory (ROM), flash memory, magnetic or optical mass storage, or any other suitable non-transitory short or long term data storage or other computer-readable media, and/or any suitable combination thereof. In the illustrated embodiment, the instructions, when read and executed by the processing system of the autonomous vehicle control system 102, cause the processing system to generate or otherwise support a steering configuration component 120 and a road configuration component 122.

The road configuration component 122 generally represents the application, process, or other component of the autonomous vehicle control system 102 that is configured to determine roadway curvature characteristics associated with the current vehicle location. The roadway curvature characteristics may be associated with different distances or ranges of distance ahead of the vehicle, that is, different lateral control horizons. For example, in one embodiment, the roadway curvature characteristics identify the geometric characteristics of the current roadway curvature (e.g., the direction of curvature relative to the direction of travel, radius of curvature, arc length, and/or the like), the geometric characteristics of the roadway curvature at an intermediate distance ahead of the vehicle immediately after the current roadway curvature, and the geometric characteristics of the roadway curvature at a distant distance ahead of the vehicle after the immediate roadway curvature. In this regard, the distant roadway curvature indicates the lateral control or maneuvering required after traversing the immediately upcoming roadway curvature. Thus, the roadway curvature characteristics characterize or otherwise include the curvature associated with current and immediately successive road conditions, that is, the alignment of the roadway laterally with respect to the orientation of the vehicle in the forward direction of travel.

In one embodiment, the road configuration component 122 may include or otherwise access stored route information for the current geographic area that encompasses the current location of the vehicle 150, and based on the current location of the vehicle 150 (e.g., from an onboard positioning system), identify or otherwise determine the current road or route that the vehicle 150 is traversing, and based thereon, identify the curvature or lateral alignment of the roadway at the current (or instantaneous) vehicle location, the curvature or lateral alignment of the roadway an intermediate distance along the roadway in the direction of travel from the vehicle location (e.g., 100 feet ahead), and the curvature or lateral alignment of the roadway a further distance along the roadway in the direction of travel from the vehicle location (e.g., 200 feet ahead). In other embodiments, the road configuration component 122 may be coupled to one or more sensing arrangements configured to sense or otherwise detect roadway curvature and provide corresponding indicia of the sensed roadway curvature characteristics to the road configuration component 122. The road configuration component 122 outputs or otherwise provides the current roadway curvature along with the future incremental roadway curvatures to the steering configuration component 120.

The steering configuration component 120 generally represents the application, process, or other component of the autonomous vehicle control system 102 that is configured to determine a current steering configuration of the axes 108, 114 and/or wheels 110, 116 of the vehicle 150 based on a previously commanded rear steering angle provided to the rear steering system 104 and a measured front steering angle. The measured front steering angle may be obtained from one or more sensing arrangements configured to measure, sense, or otherwise quantify a rotational position (or angle) of the steering wheel 118 (or steering column 112) and provide a corresponding indication of the angle of the front wheels 116 to the vehicle control system 102.

In the illustrated embodiment, the steering configuration component 120 analyzes the current and future roadway curvature and the current vehicle steering configuration, and based thereon, determines commands for operating the rear steering system 104 and the CFD system 106 to maintain the lateral track of the vehicle 150 aligned with the roadway. Thus, during autonomous operation when the front steering column 112 (and thereby the front axle 114 and wheels 116) is locked by the CFD system 106, the autonomous vehicle control system 102 determines a desired angle for the rear wheels 110 to maintain the vehicle 150 on the roadway based on the current and future roadway curvature and provides indication of the commanded rear angle to the rear steering system 104 for implementation. For reference, an example of a steering column including a friction device can be found in U.S. Pat. No. 8,886,412.

As described in greater detail below in the context of FIG. 2, in response to determining that the front steering angle is undesirable for the current or upcoming roadway curvature when the CFD system 106 is locking the steering column 112 during autonomous operation, the steering configuration component 120 signals or otherwise commands the CFD system 106 for an intermediate mode. For example, the front wheels 116 may be locked in an alignment for a left turn when the roadway conditions are transitioning rightward to a straightaway or right turn. Once the CFD system 106 is in the intermediate state, the steering configuration component 120 signals or otherwise commands the rear steering system 104 for a rear angle of zero degrees relative to the longitudinal axis of the vehicle 150 so that the self-aligning torque guides the wheels 116 towards an angle of zero degrees relative to the longitudinal axis of the vehicle 150 while the CFD system 106 is implementing the intermediate mode. Thereafter, in response to the steering configuration component 120 determining the front steering angle has reached zero degrees, the steering configuration component 120 signals or otherwise commands the CFD system 106 to reengage and lock the steering column 112 while signaling or otherwise commanding the rear steering system 104 for an angle that corresponds to the current or future roadway curvature to maintain the desired lateral track.

It should be noted that the subject matter described herein is not limited to reengaging and relocking the steering column 112 at front steering angles equal to zero, and may be implemented in a similar manner to reengage and lock the steering column 112 in response to the steering configuration component 120 determining the front steering angle is within a threshold angle of zero degrees (e.g., a steering angle having a magnitude of less than one degree). Additionally, in one or more embodiments, the CFD system 106 may be commanded to reengage and lock the steering column 112 independent of the front steering angle, for example, when a relatively brief period of time exists for mitigating the front steering angle, in which case the magnitude of the front steering angle may be reduced to the extent possible by temporarily entering the intermediate state for that brief period of time prior to reengaging and relocking the steering column 112. That said, for purposes of explanation but without limitation, the subject matter may be described in the context of reengaging and relocking the front steering angle of zero degrees.

Figure 2:
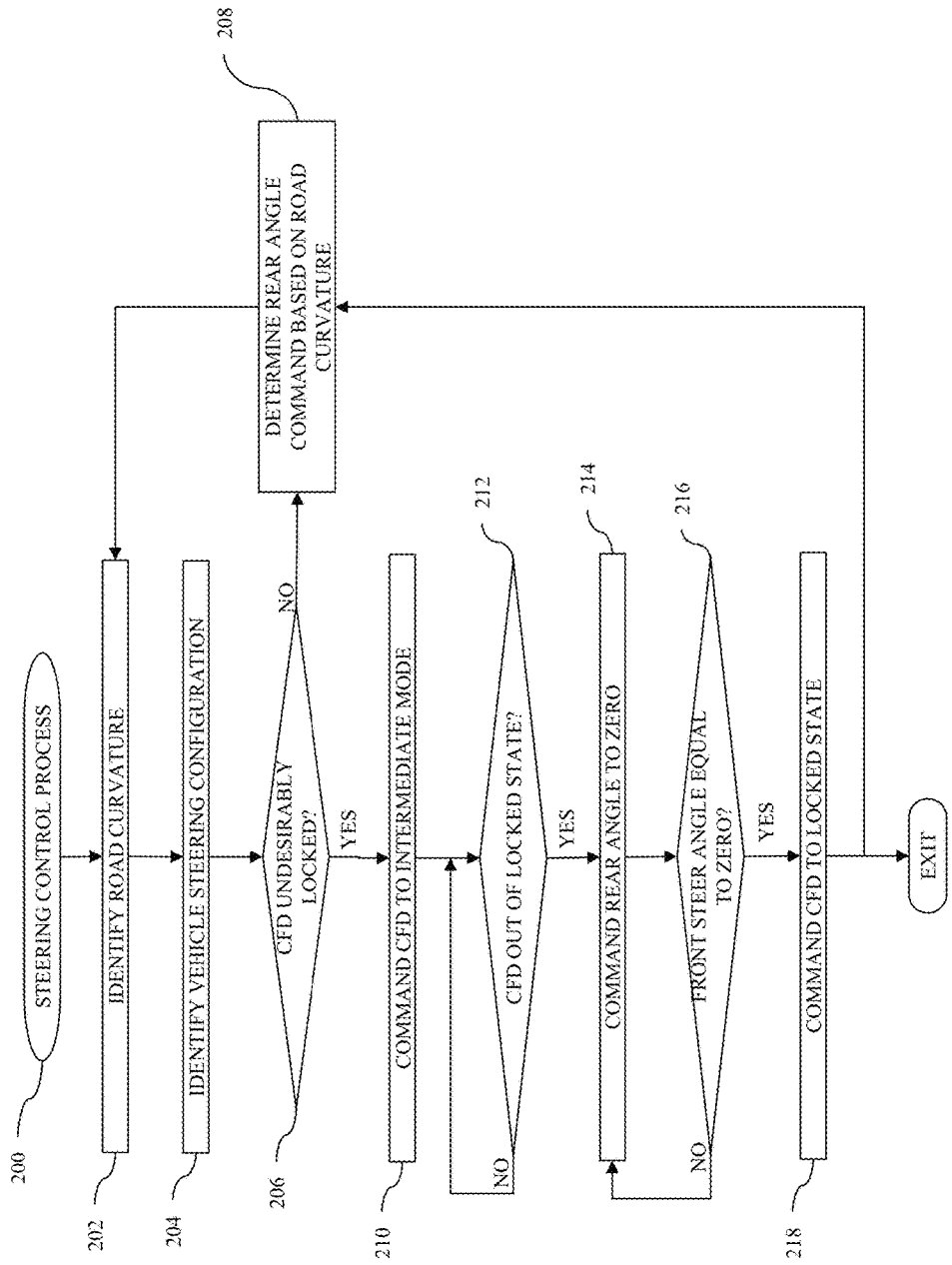
FIG. 2 is a flow diagram illustrating an exemplary steering control process suitable for implementation by the vehicle system of FIG. 1 in accordance with one or more embodiments.

FIG. 2 depicts an exemplary embodiment of a steering control process 200 for dynamically adjusting the locked front steering angle during autonomous vehicle operation. The various tasks performed in connection with the illustrated process 200 may be performed by hardware, suitably configured analog circuitry, software executed by processing circuitry, firmware executable by processing circuitry, or any combination thereof. For illustrative purposes, the following description may refer to elements mentioned above in connection with FIG. 1. In practice, portions of the steering control process 200 may be performed by different elements of the vehicle system 100, such as, for example, the control system 102, the rear steering system 104, the CFD system 106, the steering configuration component 120 and/or the road configuration component 122. It should be appreciated that practical embodiments of the steering control process 200 may include any number of additional or alternative tasks, the tasks need not be performed in the illustrated order and/or the tasks may be performed concurrently, and/or the steering control process 200 may be incorporated into a more comprehensive procedure or process having additional functionality not described in detail herein. Moreover, one or more of the tasks shown and described in the context of FIG. 2 could be omitted from a practical embodiment of the steering control process 200 as long as the intended overall functionality remains intact.

Referring to FIGS. 1-2, in exemplary embodiments, the steering control process 200 is performed when the CFD system 106 is engaged with the steering column 112 in a locked state during autonomous operation of the vehicle 150. For example, the CFD system 106 may be transitioned from a disengaged or unlocked state into the locked state in response to a locking condition. The locking condition could be user-initiated command to enter an autonomous operating mode that utilizes rear steering, or alternatively, to the locking condition could be detected based on an anomalous condition with respect to an electronic power steering system or other vehicle component. In this regard, depending on the situation, the CFD system 106 may engage and lock the steering column 112 with the front wheels 116 at a fixed nonzero angle with respect the longitudinal axis of the vehicle 150 in the direction of travel. Accordingly, the steering control process 200 may be performed upon locking the steering column 112 at a nonzero front steering angle to subsequently adjust the front steering angle on the fly during autonomous operation at nonzero vehicle speeds. In one embodiment, the steering control process 200 may be performed only upon locking the steering column 112 at a nonzero front steering angle that is greater than a threshold angle to otherwise tolerate small nonzero steering angles that can be independently compensated for by the rear steering system 104.

The illustrated steering control process 200 identifies or otherwise determines road curvature characteristics associated with the current location of the vehicle at 202, identifies or otherwise determines the current vehicle steering configuration at 204, and detects or otherwise identifies when the front steering components are undesirably locked based on the relationship between the road curvature characteristics and the current vehicle steering configuration at task 206. The vehicle control system 102 compares the locked front steering angle and the previously commanded rear steering angle to the current and upcoming roadway curvature to determine whether the locked front steering angle will impair the ability of the rear steering system 104 to maintain the lateral track of the vehicle 150 on the roadway.

When the vehicle control system 102 determines that the locked front steering angle is compatible or otherwise conforms with the current roadway curvature characteristics (e.g., the front wheels 116 are angled to the left and the current and upcoming roadway curvature corresponds to a left turn), the steering control process 200 determines a rear angle command for operating the rear steering system 104 based on the current roadway curvature characteristics and the locked front steering angle at task 208. In this regard, the vehicle control system 102 determines an angle for the rear wheels 110 relative to the longitudinal axis of the vehicle 150 in the direction of travel for maintaining the vehicle 150 at a desired lateral track along the roadway (e.g., within a particular lane of travel) based on the relationship between the locked front steering angle and the roadway curvature and the speed of the vehicle 150. The vehicle control system 102 provides a rear steering command to the rear steering system 104 that indicates the desired rear steering angle, which, in turn, results in the rear steering system 104 controlling or otherwise adjusting the rear axle 108 and/or rear wheels 110 to the desired rear steering angle. The loop defined by 202, 204, 206 and 208 repeats until the steering control process 200 detects that the locked front steering angle will impair the ability of the rear steering system 104 to maintain the lateral track of the vehicle 150 on the roadway.

In response to determining the front steering components are locked at an undesirable angle based on the current roadway curvature characteristics, the steering control process 200 continues by commanding or otherwise operating the locking system associated with the front steering components in an intermediate mode to temporarily release the front steering angle at 210. For example, the vehicle control system 102 may detect a steering adjustment condition when the CFD system 106 is in the locked state and maintaining the steering column 112 and front wheels 116 locked at a leftward angle relative to the longitudinal axis of the vehicle 150 in the direction of travel and the current roadway curvature characteristics indicate the roadway is transitioning from a left turn to a straightaway or right turn. In response to detecting a steering adjustment condition, the vehicle control system 102 commands the CFD system 106 for an intermediate mode.

In response to receiving an intermediate mode command, the CFD system 106 is operated to at least partially disengage a locking mechanism of the CFD system 106 from the steering column 112, as described in greater detail below in the context of FIGS. 3-4. Once the locking mechanism is no longer fully engaged with the steering column 112, an actuation arrangement associated with the locking mechanism is no longer operated, thereby maintaining the locking mechanism at an intermediate position within its range of motion rather than retracting the locking mechanism to a fully disengaged position. When the locking mechanism is not engaged with the steering column 112, the steering column 112 and front wheels 116 are released from the previously locked front steering angle and free to rotate in response to the self-aligning torque associated with the wheels 116. Once the CFD system 106 determines that the locking mechanism is no longer engaged with the steering column 112, the CFD system 106 transmits or otherwise provides an indication to the vehicle control system 102 that the CFD system 106 is in the intermediate mode.

In response to receiving feedback that the locking system has transitioned out of the locked state and is operating in the intermediate mode, the steering control process 200 continues by commanding or otherwise operating the rear steering system to achieve a rear steering angle of zero at 214. In this regard, the vehicle control system 102 commands the rear steering system 104 to adjust the angle of the rear wheels 110 to an angle of zero, that is, an orientation where the rotational axis of the rear wheels 110 is perpendicular to the longitudinal axis of the vehicle 150 in the direction of travel.

Thereafter, the steering control process 200 monitors the angle associated with the front steering components and detects or otherwise identifies a locking condition for relocking the front steering angle based on the angle at 216. In exemplary embodiments, while the locking system 106 is in the intermediate mode, the vehicle control system 102 detects or otherwise identifies a locking condition when the front steering angle is equal to zero (i.e., an orientation where the rotational axis of the front wheels 116 is perpendicular to the longitudinal axis of the vehicle 150 in the direction of travel) or within a threshold angle of zero. In this regard, while the front steering angle is unlocked or released and the rear steering angle is equal to zero, the self-aligning torque of the front wheels 116 will guide the front steering angle towards zero.

Once the front steering angle reaches zero or is within a threshold angle of zero (e.g., 1 degree or less), the steering control process 200 continues by commanding the locking system to the locked state at 218. In this regard, the vehicle control system 102 provides a locked mode command to the CFD system 106 once the front steering angle reaches the zero angle alignment, which, in turn results in the actuation arrangement of the CFD system 106 being operated to engage the locking mechanism with the steering column 112. By virtue of the locking mechanism being positioned at an intermediate state within its range of motion rather than being fully disengaged (e.g., an unlocked position distal to the locked position), the amount of time required for the actuation arrangement to engage the locking mechanism with the steering column 112 is reduced, thereby reducing the likelihood of the front steering angle deviating from the desired zero angle between the time when the vehicle control system 102 generates the locked mode command and the time the locking mechanism is engaged with the steering column 112.

After relocking the front steering angle, the steering control process 200 exits or otherwise resumes autonomously operating the vehicle using the rear steering system by determining a rear angle command for operating the rear steering system based on the current roadway curvature characteristics and a front steering angle equal to zero in a similar manner as described above at 208. In this regard, in some embodiments, the loop defined by tasks 202, 204, 206, 208 may repeat until identifying another steering adjustment condition, such as, for example, a scenario when a nonzero front steering angle may be desired. In such embodiments, when the steering adjustment condition corresponds to a desire for a nonzero front steering angle, rather than commanding the rear angle to zero at 214, the vehicle control system 102 may command the rear steering system 104 for a nonzero rear steering angle to allow the self-aligning torque to guide the front steering angle to the desired nonzero angle before relocking the front steering angle. For example, for a nonzero front steering angle, in response to receiving feedback that the locking system has transitioned out of the locked state and is operating in the intermediate mode, the steering control process 200 continues by commanding or otherwise operating the rear steering system to achieve a rear steering angle corresponding to the desired front steering angle at 214 (e.g., a rear steering angle of 5 degrees), and then relocking the front steering angle at 216 and 218 once the front steering angle reaches the desired angle or is otherwise within a threshold angle (e.g., a front steering angle between 4 and 6 degrees).

Figure 3:
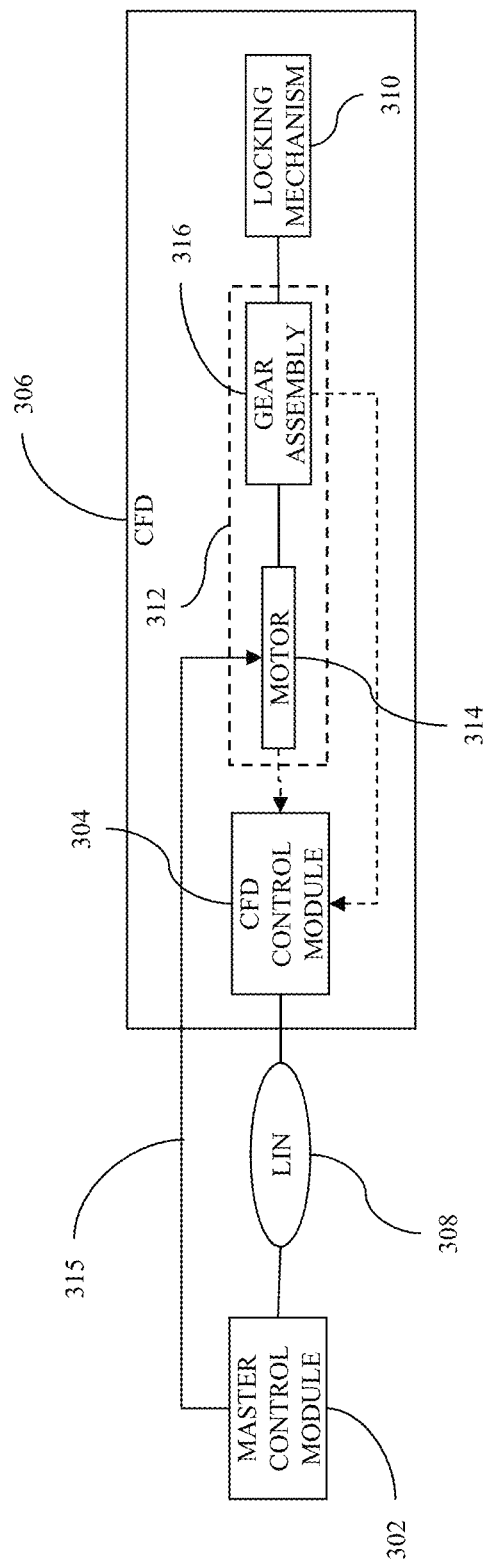
FIG. 3 is a block diagram of an exemplary locking system suitable for use in the vehicle system of FIG. 1 in conjunction with the steering control process of FIG. 2 in accordance with one or more exemplary embodiments.

FIG. 3 depicts an exemplary embodiment of a locking system 300 (or CFD system) suitable for use as the locking system 106 in the vehicle system 100 of FIG. 1 in conjunction with the steering control process 200 of FIG. 2. The CFD system 300 includes a master control module 302 communicatively coupled to a slave control module 304 associated with a column friction device 306. In the illustrated embodiment, the control modules 302, 304 are communicatively coupled via a network 308, which, in one or more exemplary embodiments is realized as a local interconnect network (LIN). The CFD 306 includes a locking mechanism 310 configured to selectively engage a steering column (e.g., steering column 112) under control of an actuation arrangement 312 operated in response to commands received from the master control module 302 via an analog interface 315. It should be understood that FIG. 3 is a simplified representation of a CFD system for purposes of explanation and is not intended to limit the scope or applicability of the subject matter described herein in any way. For example, although FIG. 3 depicts the slave control module 304 as being separate from the CFD 306, in some embodiments, the slave control module 304 may be integrated with the CFD 306 to provide a unitary CFD module capable of communicating via the LIN 308.

In exemplary embodiments, the actuation arrangement 312 includes a motor 314 that is mechanically coupled to the locking mechanism 310 via a gear assembly 316 and configured to adjust the position of the locking mechanism 310 through a range of motion to selectively engage or disengage the steering column 112. At one extent of the range of motion corresponding to a locked state (or engaged position), the locking mechanism 310 contacts or otherwise engages the steering column 112 in a manner that prevents rotation of the steering column 112. At the opposing extent of the range of motion corresponding to an unlocked state (or disengaged position), the locking mechanism 310 is retracted from and distal to the steering column 112 by its maximal extent. As described above, in response to an intermediate mode command, the locking mechanism 310 is at least partially disengaged from the steering column 112 and resides at an intermediate position between the extents of its range of motion that allows the steering column 112 to rotate or otherwise move freely with respect to the locking mechanism 310.

The slave control module 304 may alternatively be referred to herein as the CFD control module, and the slave control module 304 may be implemented using any suitable processing system and/or device configured to support the subject matter described herein, such as, for example, one or more processors, central processing units (CPUs), controllers, microprocessors, microcontrollers, processing cores and/or other hardware computing resources. In exemplary embodiments, the CFD control module 304 is coupled to the motor 314 and the gear assembly 316 via respective sensing arrangements to obtain feedback information indicative of the current operating state of the motor 314 and the current position of the gear assembly 316. In this regard, with respect to the motor 314, the CFD control module 304 is coupled to a first motor sensor configured to provide a positive indication (e.g., logic '1') when the motor 314 is being operated to lock (or engage) the steering column 112 and otherwise provide a negative indication (e.g., logic '0') when the motor 314 is not being operated to lock the steering column 112. The CFD control module 304 is also coupled to a second motor sensor configured to provide a positive (or true) indication (e.g., logic '1') when the motor 314 is being operated to unlock (or disengage) the steering column 112 and otherwise provide a negative (or false) indication (e.g., logic '0') when the motor 314 is not being operated to unlock the steering column 112. With respect to the gear assembly 316, the CFD control module 304 is coupled to a first position sensor configured to provide a positive indication (e.g., logic '1') when the gear assembly 316 is at one extent of its range of motion corresponding to the locking mechanism 310 be engaged with the steering column 112 and otherwise provide a negative indication (e.g., logic '0'). The CFD control module 304 is also coupled to a second position sensor configured to provide a positive indication (e.g., logic '1') when the gear assembly 316 is at the opposing extent of its range of motion corresponding to the locking mechanism 310 being retracted and full disengaged with the steering column 112 and otherwise provide a negative indication (e.g., logic '0'). In this regard, in an intermediate state, both position sensors associated with the gear assembly 316 may provide a negative indication (e.g., logic '0') that indicates the locking mechanism 310 is neither engaged with nor fully disengaged from the steering column 112.

The master control module 302 may similarly be implemented using any suitable processing system and/or device configured to support the subject matter described herein, such as, for example, one or more processors, central processing units (CPUs), controllers, microprocessors, microcontrollers, processing cores and/or other hardware computing resources. The master control module 302 is coupled to the motor 314 via analog interface 315 to provide command signals to enable and operate the motor 314 to engage or disengage the locking mechanism 310. The master control module 302 is also coupled to the CFD control module 304 via the LIN 308 to receive, from the CFD control module 304, feedback information indicating the current operational status of the motor 314 and the current positional status of the gear assembly 316. Based on the feedback information from the CFD control module 304 and commands received from the vehicle control system 102, the master control module 302 generates commands for operating the motor 314 while also performing diagnostics to ensure the CFD 306 is functioning properly and in a desired state.

Figure 4:
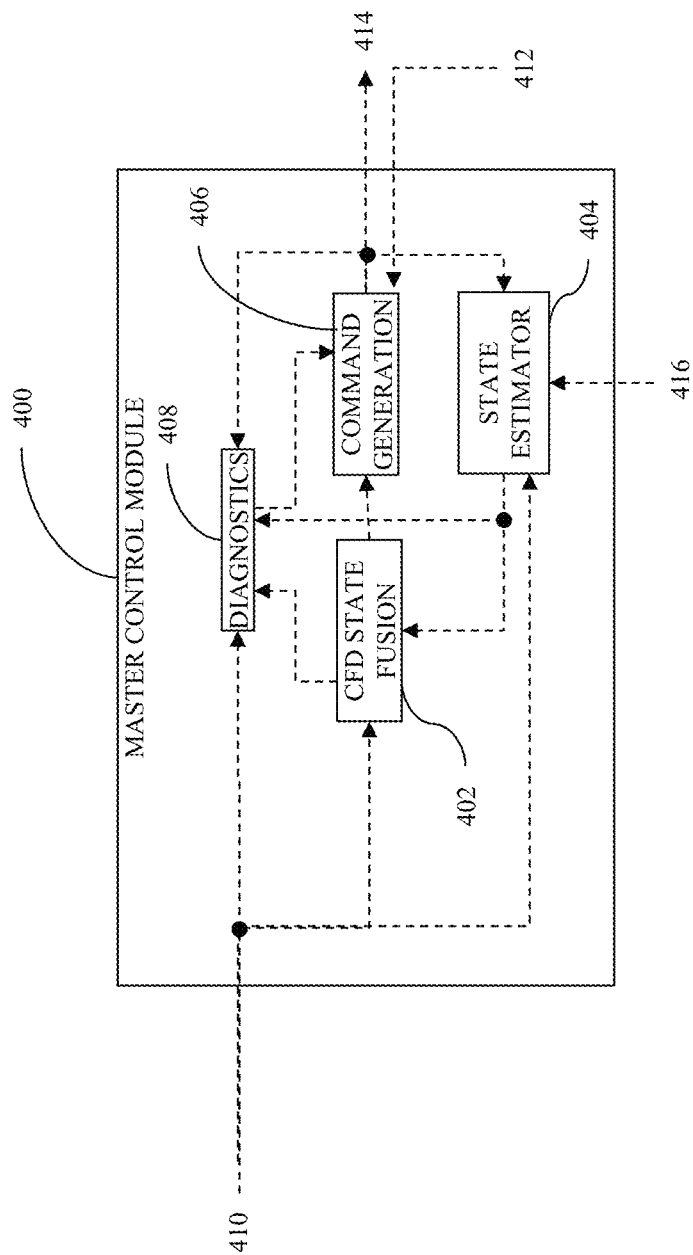
FIG. 4 is a block diagram of an exemplary master control module suitable for use in the locking system of FIG. 3 in accordance with one or more exemplary embodiments.

FIG. 4 depicts an exemplary embodiment of a control module 400 suitable for use as the master control module 302 in the CFD system 300 of FIG. 3. The control module 400 includes or otherwise accesses a data storage element (or memory) capable of storing programming instructions for execution by the processing system, that, when read and executed, cause the processing system to generate, implement or otherwise support a state fusion block 402, a state estimation block 404, a command generation block 406, and a diagnostics block 408.

The state fusion block 402 is coupled to a first input 410 of the control module 400 that is configured to receive feedback information from the CFD control module 304 via the LIN 308 as described above in the context of FIG. 3. The state fusion block 402 is also coupled to the output of the state estimation block 404 and generates or otherwise outputs a fused representation of the current state of the CFD 306 (e.g., the current operational status of the motor 314 and the current engagement status of the locking mechanism 310). In one embodiments, the state fusion block 402 outputs the most recent of the feedback state received from the CFD control module 304 and the estimated state received from the state estimation block 404. In this regard, when the frequency or update rate of the LIN 308 is less than the frequency of the control module 400, the estimated state may be utilized for purposes of generating commands for operating the motor 314 in the absence of updated feedback information from the CFD control module 304. In one or more embodiments, the state fusion block 402 is coupled to an output of the control module 400 to provide indication of the current state of the CFD 306 to the vehicle control system 102.

The command generation block 406 is coupled to a second input 412 of the control module 400 that is configured to receive a CFD mode command from the vehicle control system 102, and based on the CFD mode command and the fused CFD state, the command generation block 406 generates commands for operating the motor 314 provided at an output 414 of the control module 400 that is coupled to the motor control system or circuitry to operate the motor 314. In this regard, in response to a locked mode command from the vehicle control system 102, the command generation block 406 generates commands to operate the motor 314 to engage the locking mechanism 310 until the positional feedback from indicates the locking mechanism 310 or gear assembly 316 is in the locked or fully engaged state (e.g., engaged position sensor output equal to logic '1'). Conversely, in response to an unlocked mode command from the vehicle control system 102, the command generation block 406 generates commands to operate the motor 314 to disengage the locking mechanism 310 until the positional feedback indicates the locking mechanism 310 or gear assembly 316 is in the fully disengaged state (e.g., disengaged position sensor output equal to logic '1'). In response to an intermediate mode command from the vehicle control system 102, the command generation block 406 generates commands to operate the motor 314 to disengage the locking mechanism 310 until the positional feedback indicates the locking mechanism 310 or gear assembly 316 is not in the engaged state (e.g., engaged position sensor output equal to logic '0') and then maintains the motor 314 in its current position while still enabling power to the motor 314 (e.g., a motor enable command equal to logic '1' while motor engage/disengage commands are disabled or otherwise correspond to logic '0').

The state estimation block 404 is coupled to an input 416 of the control module 400 to receive the sensed or measured front steering angle. The state estimation block 404 is also coupled to the CFD feedback input 410 to receive the CFD feedback status and the CFD motor command output 414 to receive the CFD motor commands. Based on the most recently received CFD feedback information at input 410, the current CFD motor commands at output 414, and the current front steering angle at input 416, the state estimation block 404 determines an estimated state of the CFD 306 for use by the control module 400 in the absence of updated CFD feedback information. In this regard, the state estimation block 404 may model the behavior or response of the CFD 306 in response to the CFD motor commands to support operation of the control module 400 to control the CFD 306 in the absence of updated CFD feedback information, for example, due to latencies or other anomalies with respect to the LIN 308 or communications with the CFD control module 304. For example, when the state estimation block 404 identifies a change in the front steering angle at input 416 from the locked front steering angle, the state estimation block 404 may estimate the engagement status of the locking mechanism 310 as being at least partially disengaged (e.g., estimated engagement position sensor state of logic '0') prior to receiving updated CFD feedback information. For example, in one embodiment, the state estimation block 404 used a table-based integrator model to estimate the position of the locking mechanism 310. For example, the position of the locking mechanism 310 may be estimated using the equation $x_{pos} = \int_{t=0}^{t=T} f_1(V) \times \text{Engage} \times dt + \int_{t=0}^{t=T} f_2(V) \times \text{Disengage} \times dt$, where T is the current time after initialization, V is the battery line voltage measured at the CFD 306, Engage and Disengage are the PWM motor commands, either 0 or 1, and $f_1(V)$ and $f_2(V)$ characterize the speed of the locking mechanism 310 engaging and disengaging, respectively, as a function of the battery line voltage, the value of which may be derived from a table stored or otherwise maintained by the state estimation block 404. The resulting value for the position ($x_{pos}$) is compared to one or more calibration thresholds to characterize the resulting position as indicative of an engaged or disengaged state.

The diagnostics block 408 is also coupled to the CFD feedback input 410 to receive the CFD feedback status and the CFD motor command output 414 to receive the CFD motor commands. Additionally, the diagnostics block 408 is coupled to the output of the state estimation block 404 to receive the estimated CFD status and the state fusion block 402 to receive the fused CFD status. The diagnostics block 408 detects or otherwise identifies an anomalous condition with respect to the CFD 306 when the CFD feedback state at input 410 does not match at least one of the fused CFD state output by the state fusion block 402, the estimated CFD state output by the state estimation block 404, and the commanded CFD state output by the command generation block 406. In this regard, when the CFD feedback state does not match the output of any of the blocks 402, 404, 406, the diagnostics block 408 provides indication of the CFD state mismatch to the command generation block 406. In response to indication of the CFD state mismatch from the diagnostics block 408, the command generation block 406 generates CFD motor commands to disengage the locking mechanism 310 and overrides any locking commands from the vehicle control system 102 at input 412.

Referring to FIGS. 1-4, in response to a locking command (or locked mode command) from the vehicle control system 102 when the locking mechanism 310 is fully disengaged, the master control module 302, 400 and/or command generation block 406 provides a command, signal, or other indication to enable power to the motor 314 while deasserting or otherwise disabling other motor command signals. Thereafter, while the locked mode is still desired, once the CFD feedback or fused CFD state input to the command generation block 406 indicates the motor 314 is enabled, the master control module 302, 400 and/or command generation block 406 provides a command, signal, or other indication to operate the motor 314 to engage the steering column 112 concurrently with the motor enable command while deasserting other motor command signals. As long as the locked mode is still desired, the master control module 302, 400 and/or command generation block 406 maintains the motor enable and motor engage commands until the engage position sensor output indicates that the gear assembly 316 is at the fully engaged position. Thereafter, the master control module 302, 400 and/or command generation block 406 deasserts the motor enable and motor engage commands.

Similarly, in response to an unlocking command (or unlocked mode command) from the vehicle control system 102 when the locking mechanism 310 is engaged, the master control module 302, 400 and/or command generation block 406 provides a command, signal, or other indication to enable power to the motor 314 while deasserting or otherwise disabling other motor command signals. Thereafter, while the unlocked mode is still desired, once the CFD feedback or fused CFD state input to the command generation block 406 indicates the motor 314 is enabled, the master control module 302, 400 and/or command generation block 406 provides a command, signal, or other indication to operate the motor 314 to disengage the steering column 112 concurrently with the motor enable command while deasserting other motor command signals. As long as the unlocked mode is still desired, the master control module 302, 400 and/or command generation block 406 maintains the motor enable and motor disengage commands asserted until the disengage position sensor output indicates that the gear assembly 316 is at the fully disengaged position. Thereafter, the master control module 302, 400 and/or command generation block 406 deasserts the motor enable and motor disengage commands.

In response to an intermediate mode command from the vehicle control system 102 when the locking mechanism 310 is engaged, the master control module 302, 400 and/or command generation block 406 provides a command, signal, or other indication to enable power to the motor 314 while deasserting or otherwise disabling other motor command signals. Thereafter, while the intermediate mode is still desired, once the CFD feedback or fused CFD state input to the command generation block 406 indicates the motor 314 is enabled, the master control module 302, 400 and/or command generation block 406 provides a command, signal, or other indication to operate the motor 314 to disengage the steering column 112 concurrently with the motor enable command while deasserting other motor command signals. As long as the intermediate mode is still desired, the master control module 302, 400 and/or command generation block 406 maintains the motor enable and motor disengage commands asserted until the engage position sensor output indicates that the gear assembly 316 is not at the fully engaged position (e.g., a logic '0' engage position sensor state). Thereafter, the master control module 302, 400 and/or command generation block 406 deasserts the motor disengage command while maintaining the motor enable command. Thus, the locking mechanism 310 is partially disengaged, in that the locking mechanism 310 is not engaged with the steering column 112 but also not fully retracted to the fully disengaged position distal to the steering column 112 (e.g., a logic '0' disengage position sensor state concurrent to the logic '0' engage position sensor state).

As described above, in one or more embodiments, the state estimation block 404 may estimate the engagement status of the locking mechanism 310 as being at least partially disengaged (e.g., estimated engagement position sensor state of logic '0') prior to receiving updated CFD feedback information based on a change in the front steering angle at input 416 from the locked front steering angle. Thus, in such embodiments, the master control module 302, 400 and/or command generation block 406 may deassert the motor disengage command based on the estimated engagement status rather than waiting for confirmation from an updated engagement position sensor state. Accordingly, the motor 314 may cease operation to disengage the locking mechanism 310 at or near the minimal amount of distance from the fully engaged position that is required to allow for the front steering angle to be released and vary by a detectable amount. As a result, the amount of distance (and thereby time) required for the locking mechanism 310 to revert to the engaged or locked position is reduced in the intermediate mode relative to the unlocked mode. Additionally, by maintaining the motor enabled, the time required for reengaging the locking mechanism 310 from the intermediate position is also reduced.

As described above, once the locking mechanism 310 and/or gear assembly 316 is in the intermediate position (e.g., a logic '0' disengage position sensor state concurrent to the logic '0' engage position sensor state), the CFD system 106, 300 provides feedback to the vehicle control system 102 confirming that the CFD system 106, 300 is in the intermediate mode. Thereafter, the vehicle control system 102 commands the rear steering system 104 in a manner that results in the alignment of the front wheels 116 towards a desired front steering angle. Once the desired front steering angle is achieved (e.g., zero degrees), the vehicle control system 102 commands the CFD system 106, 300 for the locked mode to relock the steering column 112 at the desired front steering angle. In this regard, in response to the locking command when the locking mechanism 310 is in the intermediate state, the master control module 302, 400 and/or command generation block 406 verifies the motor 314 is already enabled and immediately provides a command, signal, or other indication to operate the motor 314 to engage the steering column 112 concurrently with the motor enable command while deasserting other motor command signals. Thus, there is no delay that would otherwise be associated with re-enabling the motor 314 and waiting for confirmation the motor 314 is enabled prior to operating the motor 314 to reengage the steering column 112. Accordingly, the locking mechanism 310 can relock the steering column 112 more rapidly from the intermediate mode than an unlocked mode where the locking mechanism 310 is fully disengaged.

By virtue of the subject matter described herein, the locking status of a locking system associated with a steering column can be rapidly modulated using an intermediate mode where the position of the locking mechanism is essentially floating between locked (or engaged) and unlocked (or disengaged) states. Thus, locked wheels can be released temporarily and then quickly relocked to facilitate on-the-fly adjustment of the locked wheel angle during real-time autonomous operation of the vehicle. Additionally, the intermediate mode is supported using a master-slave control scheme that incorporates locking state estimation and fusion to compensate for latencies or other communications anomalies while also performing state mismatch diagnostics that verifies or otherwise confirms that the locking system is unlikely to be in an anomalous state in the absence of updated sensor feedback information.

One exemplary use case for the subject matter described herein occurs when the front steering angle is locked during execution of a turn, for example, in response to detecting an anomalous condition with respect to a front steering system. Thereafter, the vehicle may be operated autonomously to continue and complete execution of the turn with the locked front steering angle using a rear steering system. Once the turn is executed or the lateral track of the vehicle can no longer be maintained along the roadway in a desired manner (e.g., in the proper lane), the autonomous vehicle control system may temporarily command the locking system for an intermediate mode where the locking mechanism is not engaged with the front steering column to temporarily release the front steering angle. Thereafter, the autonomous vehicle control system may monitor the front steering angle while concurrently operating the rear steering system to guide the front steering angle to a desired value. Once the front steering angle reaches the desired alignment, the autonomous vehicle control system automatically commands the locking system for the locked mode, thereby transitioning the locking mechanism from the partially disengaged state to the fully engaged state to lock the front steering angle at the desired alignment. Autonomous operation of the vehicle may then be resumed using the rear steering system with the front steering angle locked at the desired angle.

For the sake of brevity, conventional techniques related to autonomous vehicles, steering systems, locking systems, local interconnect networks, module to module communications, automotive electronics and/or electrical systems, and other functional aspects of the subject matter may not be described in detail herein. In addition, certain terminology may also be used herein for the purpose of reference only, and thus are not intended to be limiting. For example, the terms "first," "second" and other such numerical terms referring to structures do not imply a sequence or order unless clearly indicated by the context. Additionally, the foregoing description may also refer to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof. Accordingly, details of the exemplary embodiments or other limitations described above should not be read into the claims absent a clear intention to the contrary.

What is claimed is:

1. A method of steering a vehicle, the vehicle comprising a locking system coupled to a first set of one or more wheels to selectively lock a first angle of the first set, a steering system coupled to a second set of one or more wheels to control a second angle of the second set, and a control system coupled to the locking system and the steering system, the method comprising:
   commanding, by the control system, the locking system associated with the first set of the vehicle to a locked mode to lock the first angle of the first set;
   determining, by the control system, roadway curvature characteristics associated with a current location of the vehicle;
   commanding, by the control system, the steering system to adjust the second angle based on the roadway curvature characteristics when the first angle is locked;
   detecting, by the control system, a steering adjustment condition based on the first angle and the roadway curvature characteristics during operation of the vehicle; and
   in response to the steering adjustment condition:
      commanding, by the control system, the locking system to an intermediate mode to unlock the first angle, wherein a locking mechanism of the locking system is at least partially disengaged from the first set of one or more wheels in the intermediate mode; and
      thereafter operating, by the control system, the locking system to relock the first angle of the first set based on the first angle of the first set during operation in the intermediate mode.

2. The method of claim 1, further comprising autonomously operating the steering system associated with the second set of the vehicle to steer the vehicle when the first angle of the first set is locked prior to detecting the steering adjustment condition, wherein detecting the steering adjustment condition comprises detecting the steering adjustment condition while autonomously operating the steering system.

3. The method of claim 1, wherein detecting the steering adjustment condition comprises detecting the steering adjustment condition based on a relationship between the first angle of the first set and the roadway curvature characteristics.

4. The method of claim 1, wherein:
operating the locking system in the intermediate mode comprises partially disengaging a locking mechanism associated with the first set; and
operating the locking system to relock the first angle of the first set comprises reengaging the locking mechanism.

5. The method of claim 1, wherein:
detecting the steering adjustment condition comprises detecting the steering adjustment condition based on a nonzero value for the first angle relative to a direction of travel when the first angle is locked during operation of the vehicle; and
operating the locking system to relock the first angle of the first set comprises operating the locking system to relock the first angle of the first set when the first angle of the first set is less than a threshold value.

6. The method of claim 1, further comprising:
autonomously operating the steering system associated with the second set of the vehicle to steer the vehicle based on the roadway curvature characteristics when the first angle of the first set is locked prior to detecting the steering adjustment condition, wherein detecting the steering adjustment condition comprises detecting the steering adjustment condition based on a relationship between the first angle of the first set and the roadway curvature characteristics.

7. The method of claim 6, wherein operating the locking system to relock the first angle of the first set comprises operating the locking system to relock the first angle of the first set when the first angle of the first set is equal to zero.

8. The method of claim 7, further comprising:
operating the steering system to provide a second angle for the second set equal to zero while operating the locking system in the intermediate mode; and
thereafter, autonomously operating the steering system to steer the vehicle based on the roadway curvature characteristics after operating the locking system to relock the first angle of the first set.

9. The method of claim 8, wherein:
operating the locking system in the intermediate mode comprises partially disengaging a locking mechanism associated with the first set; and
operating the locking system to relock the first angle of the first set comprises reengaging the locking mechanism.

10. The method of claim 1, wherein:
operating the locking system to lock the first angle comprises commanding a column friction device to engage a steering column mechanically coupled to the first set; and
operating the locking system in the intermediate mode comprises commanding the column friction device to partially disengage the steering column.

11. A vehicle comprising:
a locking system coupled to a first set of one or more wheels to selectively lock a first angle of the first set;
a steering system coupled to a second set of one or more wheels to control a second angle of the second set; and
a control system coupled to the locking system and the steering system, wherein the control system is configured to:
command the locking system to a locked mode to lock the first angle;
determine roadway curvature characteristics associated with a current location of the vehicle;
command the steering system to adjust the second angle based on the roadway curvature characteristics when the first angle is locked;
detect a steering adjustment condition based on the first angle and the roadway curvature characteristics; and
command the locking system to an intermediate mode in response to the steering adjustment condition to unlock the first angle, wherein a locking mechanism of the locking system is at least partially disengaged from the first set in the intermediate mode.

12. The vehicle of claim 11, wherein the locking mechanism is configured to engage a steering column associated with the first set in the locked mode and partially disengage the steering column in the intermediate mode.

13. The vehicle of claim 11, wherein the control system commands the steering system to adjust the second angle to zero when the locking system is in the intermediate mode.

14. The vehicle of claim 11, wherein the locking system comprises:
a locking mechanism configured to lock the first angle of the first set at a first extent of a range of motion;
an actuation arrangement coupled to the locking mechanism;
a first control module coupled to the actuation arrangement to obtain and output sensed information indicative of a status of the actuation arrangement;
a second control module coupled to the control system, the first control module and the actuation arrangement to:
operate the actuation arrangement to adjust a position of the locking mechanism towards the first extent of the range of motion in response to the command to the locked mode;
operate the actuation arrangement to adjust the position of the locking mechanism away from the first extent in response to the command to the intermediate mode until the locking mechanism resides at an intermediate position within the range of motion.

15. The vehicle of claim 14, wherein the second control module is configured to determine an estimated state of the actuation arrangement based at least in part on the sensed information and a preceding command provided to the actuation arrangement and determine a subsequent command for operating the actuation arrangement based at least in part on the estimated state.

16. The vehicle of claim 14, wherein the locking mechanism engages a steering component at the first extent of the range of motion, and wherein the second control module is configured to determine an estimated state of the actuation arrangement corresponding to the intermediate position based at least in part on a change in an angle associated with the steering component and cease operating the actuation arrangement based on the estimated state.

17. The vehicle of claim 14, wherein the second control module is configured to maintain the actuation arrangement enabled when the locking mechanism resides at the intermediate position.

18. A vehicle comprising:
a locking system coupled to a first set of one or more wheels to selectively lock a first angle of the first set;

a steering system coupled to a second set of one or more wheels to control a second angle of the second set; and a control system coupled to the locking system and the steering system, wherein the control system is configured to:
command the locking system to a locked mode to lock the first angle;
determine roadway curvature characteristics associated with a current location of the vehicle;
command the steering system to adjust the second angle based on the roadway curvature characteristics when the first angle is locked;
detect a steering adjustment condition based on the first angle and the roadway curvature characteristics;
command the locking system to an intermediate mode in response to the steering adjustment condition to unlock the first angle;
command the steering system to adjust the second angle to zero when the locking system is in the intermediate mode;
command the locking system to the locked mode to relock the first angle when the first angle is less than a threshold value during the intermediate mode; and
thereafter command the steering system to adjust the second angle based on the roadway curvature characteristics.

* * * * *